United States Patent
Brochi et al.

(10) Patent No.: US 9,425,992 B2
(45) Date of Patent: Aug. 23, 2016

(54) MULTI-FRAME AND FRAME STREAMING IN A CONTROLLER AREA NETWORK (CAN) WITH FLEXIBLE DATA-RATE (FD)

(71) Applicant: Freescale Semiconductor, Inc., Austin, TX (US)

(72) Inventors: Antonio Mauricio Brochi, Campinas (BR); Frank Herman Behrens, Campinas (BR)

(73) Assignee: Freescale Semiconductor, Inc., Austin, TX (US)

( * ) Notice: Subject to any disclaimer, the term of this patent is extended or adjusted under 35 U.S.C. 154(b) by 144 days.

(21) Appl. No.: 14/185,896

(22) Filed: Feb. 20, 2014

(65) Prior Publication Data

US 2015/0237174 A1    Aug. 20, 2015

(51) Int. Cl.
*H04L 12/40* (2006.01)
*H04L 12/64* (2006.01)

(52) U.S. Cl.
CPC .................................. *H04L 12/6418* (2013.01)

(58) Field of Classification Search
CPC .......................................... H04L 2012/40215
See application file for complete search history.

(56) References Cited

U.S. PATENT DOCUMENTS

| | | | |
|---|---|---|---|
| 6,988,236 B2 | 1/2006 | Ptasinski et al. | |
| 8,516,130 B2 | 8/2013 | Olsen et al. | |
| 2002/0126691 A1* | 9/2002 | Strong | H04L 1/0002 370/447 |
| 2003/0043798 A1* | 3/2003 | Pugel | H04B 7/18582 370/389 |
| 2006/0195161 A1* | 8/2006 | Li | A61N 1/37223 607/60 |
| 2006/0271694 A1* | 11/2006 | Matsuo | H04L 12/4135 709/229 |
| 2009/0100189 A1* | 4/2009 | Bahren | H04L 12/422 709/231 |
| 2009/0122812 A1* | 5/2009 | Steiner | H04J 3/0652 370/503 |
| 2014/0129748 A1* | 5/2014 | Muth | G06F 13/4072 710/106 |

FOREIGN PATENT DOCUMENTS

WO    2012150248 A1    11/2012

* cited by examiner

*Primary Examiner* — Fan Ng (57) ABSTRACT

Systems and methods for multi-frame and frame streaming in a Controller Area Network (CAN) with Flexible Data-Rate (FD). In some embodiments, a method may include creating, by a device coupled to a CAN network configured to support a CAN Flexible Data-Rate (FD) protocol, a data frame comprising a field that indicates a multi-frame or streaming transmission, and transmitting the data frame in the multi-frame or streaming transmission. A CAN node may include message processing circuitry configured to receive a data frame comprising a Data Length Code (DLC) field configured to indicate multi-frame operation or streaming operation. The message processing circuitry may be further configured to receive another data frame in the absence of an arbitration process between the data frames.

15 Claims, 6 Drawing Sheets

MULTI-FRAME AND FRAME STREAMING IN A CONTROLLER AREA NETWORK (CAN) WITH FLEXIBLE DATA-RATE (FD)

FIELD

This disclosure relates generally to network communications, and more specifically, to systems and methods of Multi-Frame and Frame Streaming in a Controller Area Network (CAN) with Flexible Data-Rate (FD).

BACKGROUND

A Controller Area Network (CAN) is an asynchronous serial bus network that connects devices, sensors, and actuators in various control applications (e.g., automotive, industrial automation, avionics, medical and office equipment, consumer appliances, etc.). Different CAN networks have different performance characteristics. Automotive CAN networks, for example, may be divided into two distinct categories—body control and powertrain. Body control networks enable communications among passenger comfort and convenience systems, and are typically less resource-intensive than powertrain networks, which service engine and transmission control.

Over the course of the last decade, two major physical layer designs have emerged in most CAN applications. They both communicate using a differential voltage on a pair of wires and are commonly referred to as a high-speed CAN (e.g., at rates of up to 1 Mbps) and low-speed CAN (e.g., at rates of up to 125 Kbps). Other CAN interfaces, however, may communicate using a single wire (e.g., at rates of up to 33.3 Kbps). Generally speaking, each node in a CAN network may be able to transmit and receive messages over a CAN bus.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

The inventors hereof have determined that there are certain communication applications that would benefit from an increase in effective transmission rate without a corresponding increase in protocol frequency (bits per second). For example, the Controller Area Network (CAN) protocol is used to flash data into electronic chips being manufactured in automotive or industrial applications. Unfortunately, these flashing operations can take several hours with conventional available CAN infrastructure, which can cause significant delays in the production lines. To address these, and other problems, embodiments disclosed herein are configured to provide faster communications that reduce flash data upload cycle time (e.g., vehicle Flash and re-flashing upload time).

Particularly, embodiments disclosed herein are directed to systems and methods for Multi-Frame and Frame Streaming of messages transmitted and/or received over a communication bus. In some implementations, these systems and methods may be particularly well suited for deployment in a CAN network, and more specifically in a CAN network that implements a Flexible Data-Rate (FD) protocol. For example, modification of the CAN FD protocol may allow several CAN frames to be transmitted at high bit rate mode without the need for CAN bus arbitration between frames. Although some of the examples herein are discussed in the context of automotive environments, these techniques may also be employed in other environments (e.g., industrial automation, avionics, medical and office equipment, consumer appliances, etc.).

Figure 1:
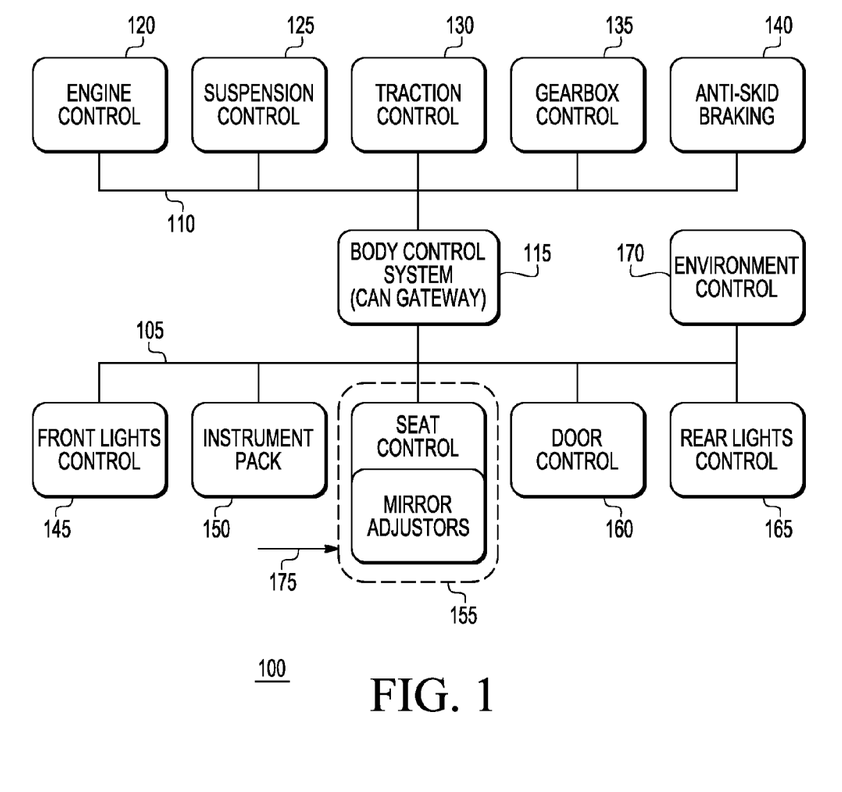
FIG. 1 is a block diagram of an example of a CAN network deployed in an automobile according to some embodiments.

Turning to FIG. 1, a block diagram of an example of a CAN network 100 deployed in an automobile is depicted. In some embodiments, one or more of nodes or devices 115-170 may be implemented, at least in part, using one or more of the systems and methods described below. As illustrated, CAN gateway 115 (e.g., body control system) is coupled to low-speed CAN bus 105 as well as high-speed CAN bus 110, and it may be configured to enable communications between nodes across the two buses. Powertrain devices or nodes coupled to high-speed CAN bus 110 include: engine control 120, suspension control 125, traction control 130, gearbox control 135, and anti-skid breaking 140. Conversely, body control devices or nodes coupled to low-speed CAN bus 105 include front lights control 145, instrument pack 150 (e.g., dashboard displays and information systems, etc.), seat/mirror control 155, door control 160 (e.g., remote lock/unlock, windows, etc.), rear lights control 165, and environment control 170 (e.g., A/C, heater, particle filter, etc.).

In some embodiments, the communication protocol used in various communications among components 120-170 may be the CAN protocol defined in the international standard ISO 11898-1. Accordingly, in some embodiments, low-speed CAN bus 105 may operate based upon the ISO 11898-3 standard and high-speed CAN bus 110 may operate based upon the ISO 11898-2 standard.

Moreover, components 120-170 communicating over either low-speed CAN bus 105 or high-speed CAN bus 110 may implement a Flexible Data-Rate (FD) protocol. The CAN FD protocol is described, for example, in International Application Published Under the Patent Cooperation Treaty (PCT) No.: WO2012150248. Particularly, the CAN FD shares the same physical layer as the regular CAN protocol, but the frame format of the CAN FD includes additional control bits that enable a frame format with different data length coding and optionally switching to a faster bit rate after an arbitration process is executed. These elements are discussed in more detail in connection with FIG. 4 below.

It is emphasized that automotive CAN network 100 is shown only by way of example. Other nodes or elements may be present in CAN network 100, and those elements may be connected in different ways. In some cases, one or more of nodes 115-170 may be divided into sub-nodes. For instance, the mirror control portion of seat/mirror control node 155 may be coupled to single-wire CAN interface or bus 175. In other cases, one or more of nodes 115-170 may be combined into fewer nodes. Additionally or alternatively, one or more of nodes 115-170 may be networked using a Local Interconnect Network (e.g., ISO 7498) bus or other suitable communication bus. Examples of other types of devices or nodes that may be present in CAN network 100 include, but are not limited to, airbag controls, sunroof controls, alarms, navigation systems, entertainment devices (e.g., video, audio, etc.), parking assistance modules, communication modules (e.g., cellular, Bluetooth®, Wi-Fi®, etc.), diagnostic systems (e.g., on-board diagnostics), etc.

Figure 2:
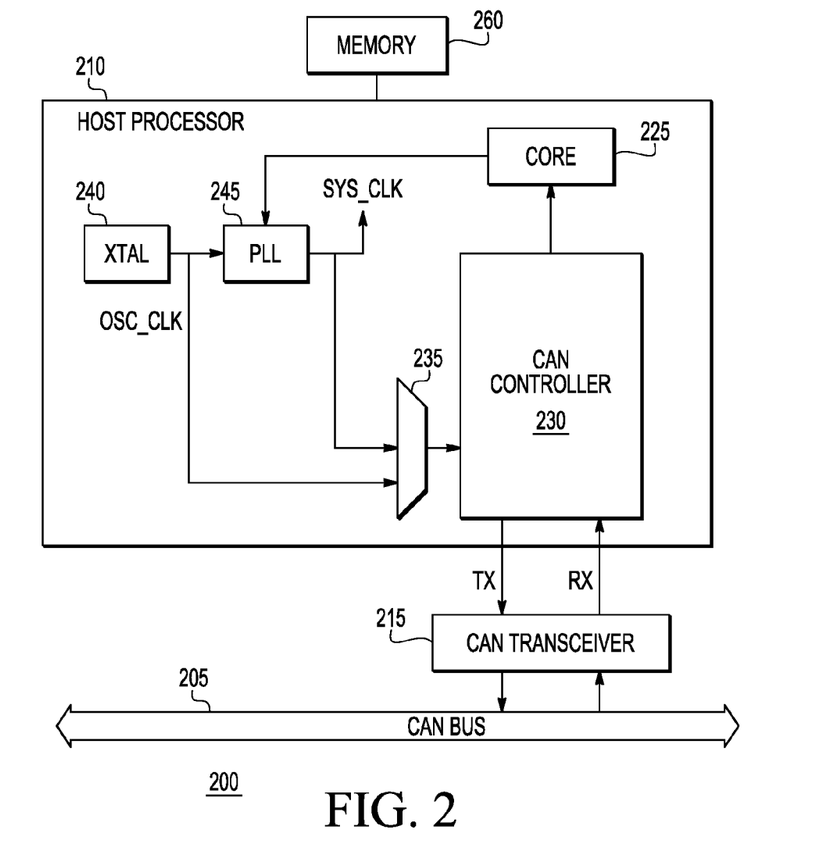
FIG. 2 is a block diagram of an example of a CAN node according to some embodiments.
Figure 3:
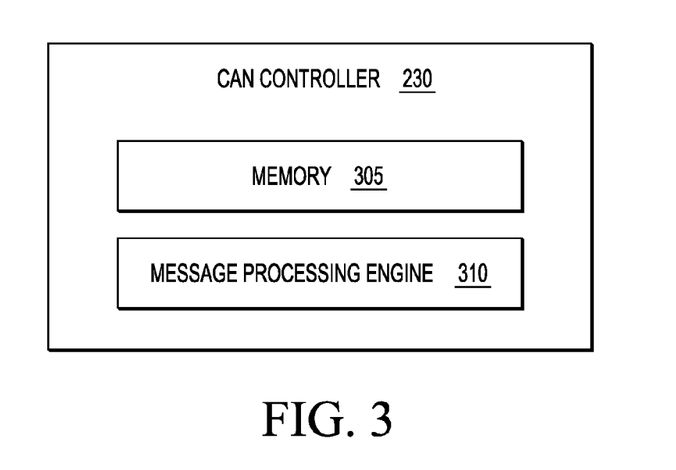
FIG. 3 is a block diagram of an example of a CAN controller according to some embodiments.

In some embodiments, each of nodes 115-170 may include one or more host processors as well as one or more sensors and/or actuators configured to perform one or more operations. In addition, nodes 115-170 may communicate with each other in a multiplexed fashion over CAN network 100, which provides a multi-master broadcast serial bus. For example, each of nodes 115-170 may include a CAN controller integrated within its host processor and/or operably coupled thereto, as illustrated in FIGS. 2 and 3. As such, nodes 115-170 may be configured to send and receive messages to each other using their respective CAN controllers, each message being serially transmitted onto the CAN bus and having an identifier (ID) portion (e.g., 11 or 29 bits) and a payload portion (e.g., 8 bytes).

FIG. 2 is a block diagram of an example of CAN node 200. In some embodiments, CAN node 200 may be one or more of nodes or devices 115-170 in FIG. 1. As illustrated, CAN node 200 includes host processor 210, which in turn includes crystal oscillator signal source 240, phase-locked loop (PLL) circuit 245, at least one processor core 225, multiplexing or selecting circuit 235, and CAN controller 230. CAN transceiver 215 is coupled to CAN bus 205 (e.g., one of buses 105 or 110 in FIG. 1), as well as CAN controller 230. Memory 260 is coupled to host processor 210. In this diagram, portion(s) of CAN node 200 that would be specific to a given deployment (e.g., particular sensor(s) and/or actuator(s)) have been omitted for sake of simplicity, although it should be understood that any number of different peripheral devices (not shown) may be coupled to host processor 210 via any suitable interface.

The illustrative, non-limiting implementation of CAN node 200 in FIG. 2 depicts CAN controller 230 and multiplexing or selecting circuit 235 integrated into host processor 210. In other implementations, however, CAN controller 230 and multiplexing and/or selecting circuit 235 may be, at least in part, physically separate from host processor 210 but otherwise operably coupled thereto. For example, two or more host processors 210 may use a single CAN controller 230 shared among them. More generally, it should be noted that numerous variations of CAN node 200 will be apparent to a person of ordinary skill in the art in light of this description. For instance, host processor 210 may include two or more processor cores (e.g., dual-core, quad-core, etc.), memory 260 and/or CAN transceiver 215 may be at least partially integrated within host processor 210, etc.

During normal operation, host processor 210 may be configured to execute one or more instructions stored in memory 260 to thereby perform its programmed tasks. One or more of these tasks may be specific to the node's purpose(s) within CAN network 100 (e.g., traction control node 130 performs traction control tasks). Other tasks may include processing CAN messages received (RX) over CAN bus 205 through CAN transceiver 215 and CAN controller 230, and/or transmitting CAN messages (TX) over CAN bus 205 through CAN controller 230 and CAN transceiver 215. In certain implementations, CAN controller 230 may store serially received bits from CAN bus 205 until an entire CAN message is received, which may then be provided to core 225 (e.g., upon the triggering of an interrupt). Conversely, CAN controller 230 may transmit CAN messages received from core 225 serially onto CAN bus 205 in an appropriate format.

Crystal oscillator signal source 240 may provide a clock signal ("OSC_CLK") that is processed by PLL circuit 245 to generate yet another clock signal ("SYS_CLK"), which may then be used by core 225 in host processor 210's. In some situations, instructions stored in memory 260 may allow host controller 210 to reduce its power consumption. When operating in "low power mode," for example, host controller 210 may provide a reduced clock frequency to core 225 and other components, and/or host controller 210 may be at least partially powered down.

It should be understood that the various operating modes of host processor 210 and CAN controller 230 may be independent and/or different from each other. For instance, host processor 210 may be considered to operate in low power mode overall (e.g., because core 225 is receiving a reduced clock frequency) while CAN controller 230 operates in any of a plurality of different operating modes with varying amounts of power consumption.

Embodiments of host processor 210 may include, but are not limited to, application specific integrated circuits (ASICs), system-on-chip (SoC) circuits, digital signal processors (DSPs), field-programmable gate arrays (FPGAs), processors, microprocessors, controllers, microcontrollers (MCUs), or the like. Memory 260 may include any tangible memory apparatus, circuit, or device which, in some cases, may be integrated within host processor 210 as one chip. For example, memory 260 may include flip-flops, registers, Static Random Access Memory (SRAM), Nonvolatile RAM (NVRAM, such as "flash" memory), and/or Dynamic RAM (DRAM) such as synchronous DRAM (SDRAM), double data rate (e.g., DDR, DDR2, DDR3, etc.) SDRAM, read only memory (ROM), erasable ROM (EROM), erasable programmable ROM (EPROM), electrically erasable programmable ROM (EEPROM), etc. In other cases, memory 260 may also include one or more memory modules to which the memory devices are mounted, such as single inline memory modules (SIMMs), dual inline memory modules (DIMMs), etc. CAN transceiver 215 may provide a physical layer (PHY) interface.

FIG. 3 is a block diagram of CAN controller 230 (shown in FIG. 2) according to some embodiments. As shown, CAN controller 230 includes memory 305 and message processing engine or circuitry 310, which may be operably coupled to each other. During normal operation, message processing engine 310 may cause one or more CAN messages provided by core 225 and/or stored in memory 305 to be transmitted over CAN bus 205 through CAN transceiver 215. Message processing engine 310 may also receive one or more CAN messages provided by CAN transceiver 215 from CAN bus 205, decode and/or translate those received messages, and perform some additional processing. For example, in some cases, message processing engine 310 may cause a received CAN message to be provided to core 225. Additionally or alternatively, message processing engine 310 may compare the contents of a received CAN message (e.g., identification and/or data bits) against stored information (e.g., in memory 305) to determine whether to take some predetermined action in response to the received message, etc. For instance, message processing engine 310 may select, depending upon the result of the comparison, one of a plurality of response messages stored in memory 305 to be transmitted over CAN bus 205 corresponding to the received CAN message. Further-more, the selection and transmission of such a response message may be performed autonomously and without intervention from core 225.

Memory 305 may be configured to buffer one or more received or transmitted CAN messages. In some cases, memory 305 may also be configured to store program instructions that allow message processing engine 310 to process a received CAN message according to one or more of a plurality of different message handling protocols when CAN controller 230 is operating under a corresponding one of a plurality of operating modes. Additionally or alternatively, memory 305 may be further configured to store instructions that allow engine 310 to implement certain operations described herein.

In some embodiments, the modules or blocks shown in FIG. 3 may represent processing circuitry and/or sets of software routines, logic functions, and/or data structures that, when executed by the processing circuitry, perform specified operations. Although these modules are shown as distinct logical blocks, in other embodiments at least some of the operations performed by these modules may be combined in to fewer blocks. Conversely, any given one of modules 305-310 may be implemented such that its operations are divided among two or more logical blocks. Although shown with a particular configuration, in other embodiments these various modules or blocks may be rearranged in other suitable ways.

Figure 4:
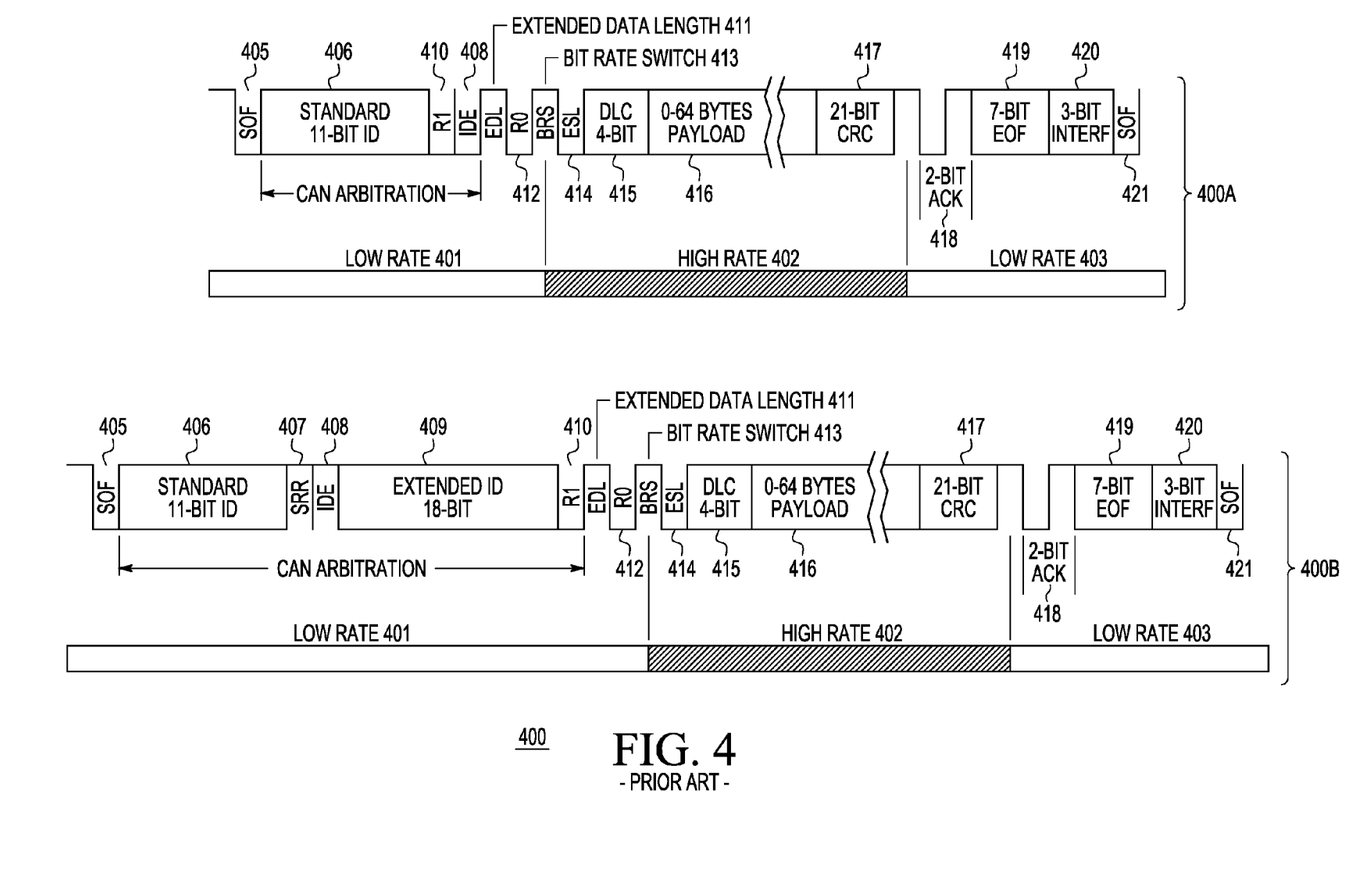
FIG. 4 is a diagram of "prior art" CAN FD data frames or messages

FIG. 4 is a diagram of well-known CAN FD data frames or messages 400 labeled "prior art." In some cases, CAN FD data frames 400A and 400B may be exchanged between two or more of nodes or devices 115-170 in FIG. 1. Particularly, data frames 400A and 400B include high bit rate portions or "data phases" 402 between low bit rate portions or "arbitration phases" 401 and 403. In this example, data frame 400A represents a CAN FD base format, and data frame 400B represents a CAN FD extended format. The different fields of data frames 400A and 400B are outlined in Table I below:

TABLE I

| Field Name | Detail Number | Length (bits) | Description |
| --- | --- | --- | --- |
| Start-of-Frame (SOF) | 405 | 1 | Indicates the start of frame transmission |
| Standard ID | 406 | 11 | First part of a unique identifier for the data, which also represents the message priority |
| Substitute Remote Request (SRR) | 407 | 1 | A recessive bit (1) that serves as a placeholder |
| Identifier Extension Bit (IDE) | 408 | 1 | When recessive (1), this bit indicates more identifier bits follow in the Extended ID portion. When dominant (0), the EDL bit is the next |
| Extended ID | 409 | 18 | Second part of the unique identifier for the data, which also represents the message priority |
| Reserved Bit (R1) | 410 | 1 | A dominant bit (0) |
| Extended Data Length (EDL) | 411 | 1 | Reserved bits accepted as either dominant or recessive to distinguish between a standard CAN frame format and the CAN FD frame format |
| Reserved Bit (R0) | 412 | 1 | A dominant bit (0) |
| Bit Rate Switch (BRS) | 413 | 1 | The value of BRS decides whether the bit rate in the Data-Phase is the same as in the Arbitration-Phase (BRS dominant) or whether the predefined faster bit rate is used in the Data-Phase (BRS recessive) |

TABLE I-continued

| Field Name | Detail Number | Length (bits) | Description |
| --- | --- | --- | --- |
| Error State Indicator (ESI) | 414 | 1 | Dominant for error active and recessive for error passive |
| Data Length Code (DLC) | 415 | 4 | Number of bytes of data to be transmitted |
| Data Payload | 416 | 0-64 | Actual data transmitted or received |
| Cyclic Redundancy Check (CRC) | 417 | 15 to 21 | Cyclic redundancy check |
| Acknowledgement Bits (ACK) | 418 | 2 | Indicates acknowledgement of the integrity of the data |
| End of Frame (EOF) | 419 | 7 | Marks the end of the current frame |
| Interframe Space 420 | 420 | 3 | Spacing between frames |
| Start-of-Frame (SOF) | 421 | 1 | The SOF of a subsequent frame (the remainder of the subsequent frame is not shown) |

With respect to data frames or messages 400, if two or more of devices 120-170 start transmitting their own messages at the same time, a priority-based arbitration scheme is used to decide which one will be granted permission to continue transmitting. During arbitration phases 401 and 403, each transmitting node monitors the state of bus 205 and compares a received bit with a transmitted bit. If a node determines that a dominant bit is received when a recessive bit is transmitted, then that node stops transmitting (i.e., it lost arbitration). In the standard CAN FD protocol, the arbitration process is performed at lower bit rates than the actual data transmission.

Figure 5:
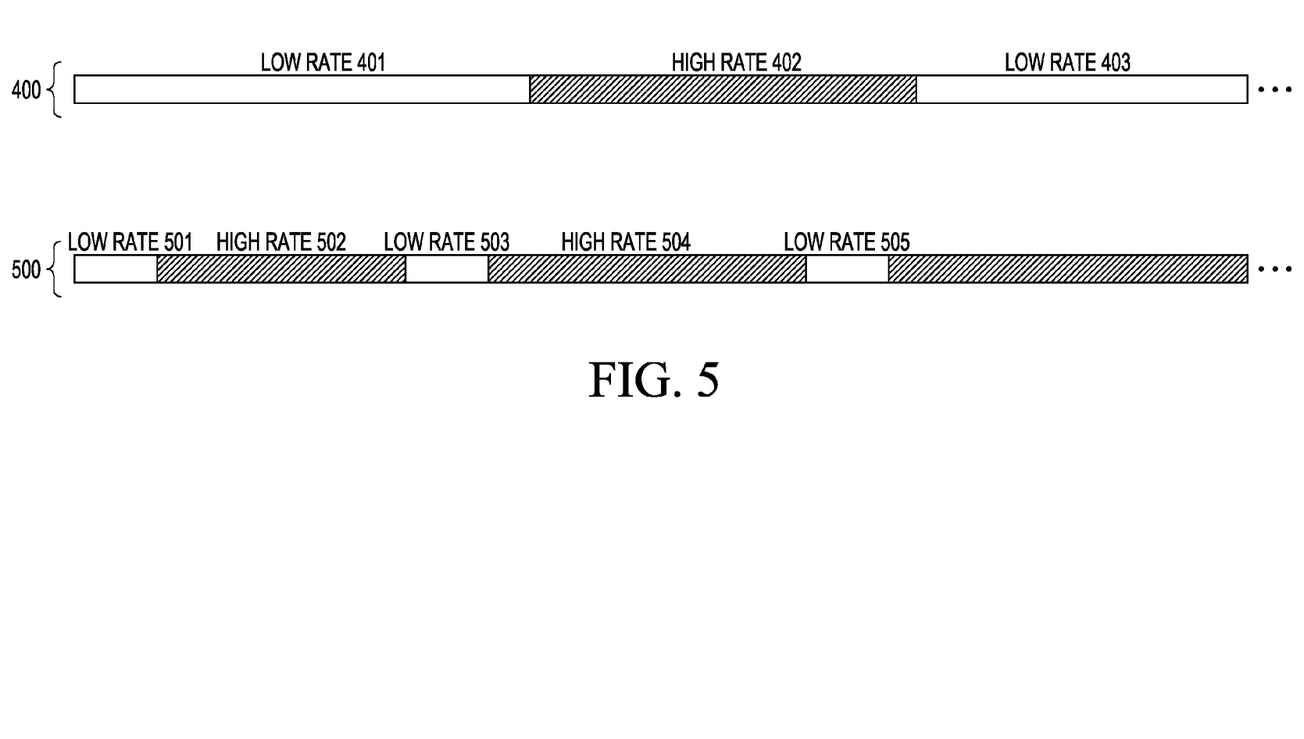
FIG. 5 is a diagram comparing different bit rate portions of a CAN FD frame against bit rate portions of a CAN frame using Multi-Frame and Frame Streaming techniques according to some embodiments.

FIG. 5 is a diagram comparing different bit rate portions of a CAN FD frame against transmission rate portions of a CAN frame using Multi-Frame and Frame Streaming techniques according to some embodiments. To illustrate certain distinctions, frame 400 of FIG. 4 is compared against frame 500, which includes low bit rate portions 501, 503, and 505 interleaved with high bit rate portions 502 and 504.

It may be noted that frame 500 has shorter low bit rate portions than frame 400 and that frame 500 avoids the CAN bus arbitration phase when a sequence of frames is transmitted, thus achieving higher data payload throughput. As such, in some embodiments, the Multi-Frame and Frame Streaming techniques (which are discussed below in connection with FIGS. 6 and 7, respectively) may enable faster communication in systems based on the CAN FD protocol by modifying the CAN FD protocol in order to allow two or more CAN frames to be transmitted at high bit rate mode without arbitration periods between subsequent frames. That is, frame 500 may increase the effective transmission bit rate in CAN FD communications without increasing the protocol frequency (bits per second), thus allowing the use of current available CAN physical interface to increase the effective bit rate provided by the CAN FD protocol.

In some cases, the increase in transmission rate may be used, for example, to reduce flash data upload cycle time for end of line programming (e.g., vehicle Flash and re-flashing upload time) in automotive or industrial applications, which otherwise can take several hours with currently available vehicle communication infrastructure.

Figure 6:
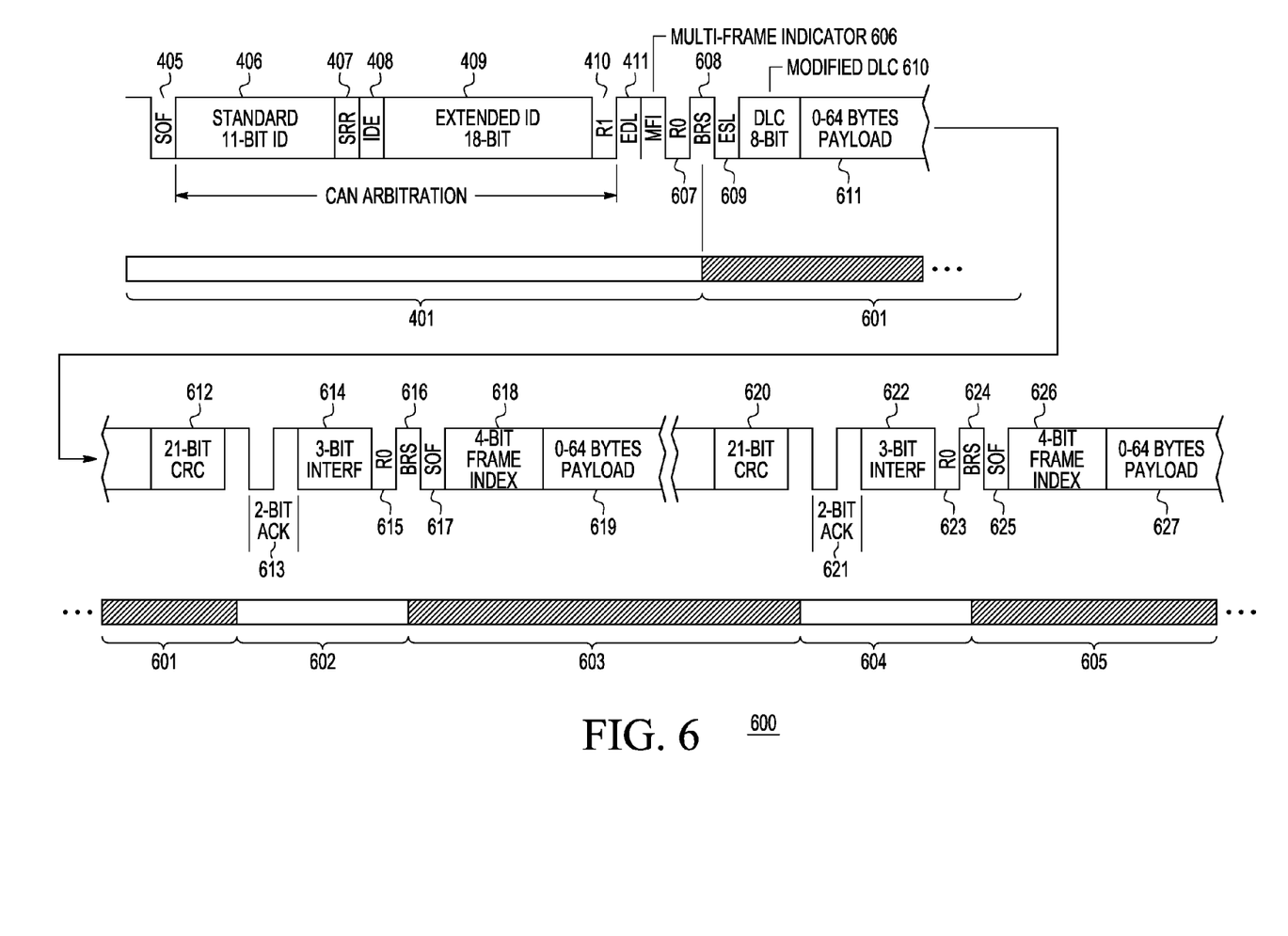
FIG. 6 is a diagram of a Streaming CAN protocol frame(s) or message(s) according to some embodiments.

FIG. 6 is a diagram of Streaming CAN protocol frame(s) or message(s) 600 according to some embodiments. Initial arbitration period 401 is the same as in FIG. 4, including portions 405-411. Also, portions 607-609 are similar to portions 412-414, and portions 611-614 (as well as portions 619-622) are similar to portions 416-420 of CAN FD frame 400. Portions 615-617 and 623-625 include "Reserved" bits, "Bit Rate Switch" bits, and "Start-of-Frame" bits discussed in Table I.

In contrast with frame 400, however, high bit rate portions 601, 603, and 605, which include data payloads, are interspersed by low bit rate portions 602 and 604 without additional arbitration portions. Streaming CAN frame 600 further includes Multi-Frame Indicator (MFI) bit 606 bit used to convey to a receiver node that Streaming frame 600 implements a streaming technique. Streaming CAN frame 600 also includes modified DLC portion (e.g., 8 bits) 610, which may be used to indicate the streaming type of transmission (e.g., a value of "0000"), thus an undefined number of frames is transmitted. In this case the frame ID is not transmitted, being the ID of the first frame that won the arbitration considered as the ID for all frames in a stream.

Modified DLC 610 may also indicate the data length of payload 611 for all subsequent frames. Frame index 618 preceding payload 619 and frame index 626 preceding payload 627 may indicate the index of the current frame in a streaming transmission. The index may be incremented starting from 1 up to F (any suitable integer value) and then wraps back to 1 if more frames are transmitted thereafter.

To illustrate certain advantages of using the streaming techniques of frame 600 consider the following example, which assumes a CAN low bit rate of 500 kbps, a CAN high bit rate of 8 Mbps, a 64-byte payload for FD frames, and an extended 29-bit ID. In that case, the transmission of 16 payload frames using the conventional CAN FD protocol would result in 48 bits transmitted in low rate per frame, 539 bits transmitted in high rate per frame, an effective transmission rate of 3.59 Mbps, and a total transmission time of 2.65 ms. Conversely, transmission of the same 16 payload frames using a Streaming technique of embodiments of the present invention would result in 8 bits transmitted in low rate per frame, 579 bits transmitted in high rate per frame, an Effective transmission rate of approximately 7.89 Mbps, and a total transmission time=1.38 ms. That is, the streaming technique in this example reduced the total transmission time in half.

As another example, assume a CAN low bit rate of 500 kbps, a CAN high bit rate of 8 Mbps, an 8-byte payload for FD frame, and an extended 29-bit ID. In this case, transmission of 16×8-byte payload frames using the conventional CAN FD protocol would result in 48 bits transmitted in low rate, 91 bits transmitted in high rate, an effective transmission rate of 1.3 Mbps, and a total transmission time of 1.75 ms. In contrast, transmission of the same 16 payload frames using a Streaming technique would result in 8 bits transmitted in low rate, 131 bits transmitted in high rate, an effective transmission rate of 3.4 Mbps, and a total transmission time of 0.50 ms.

Figure 7:
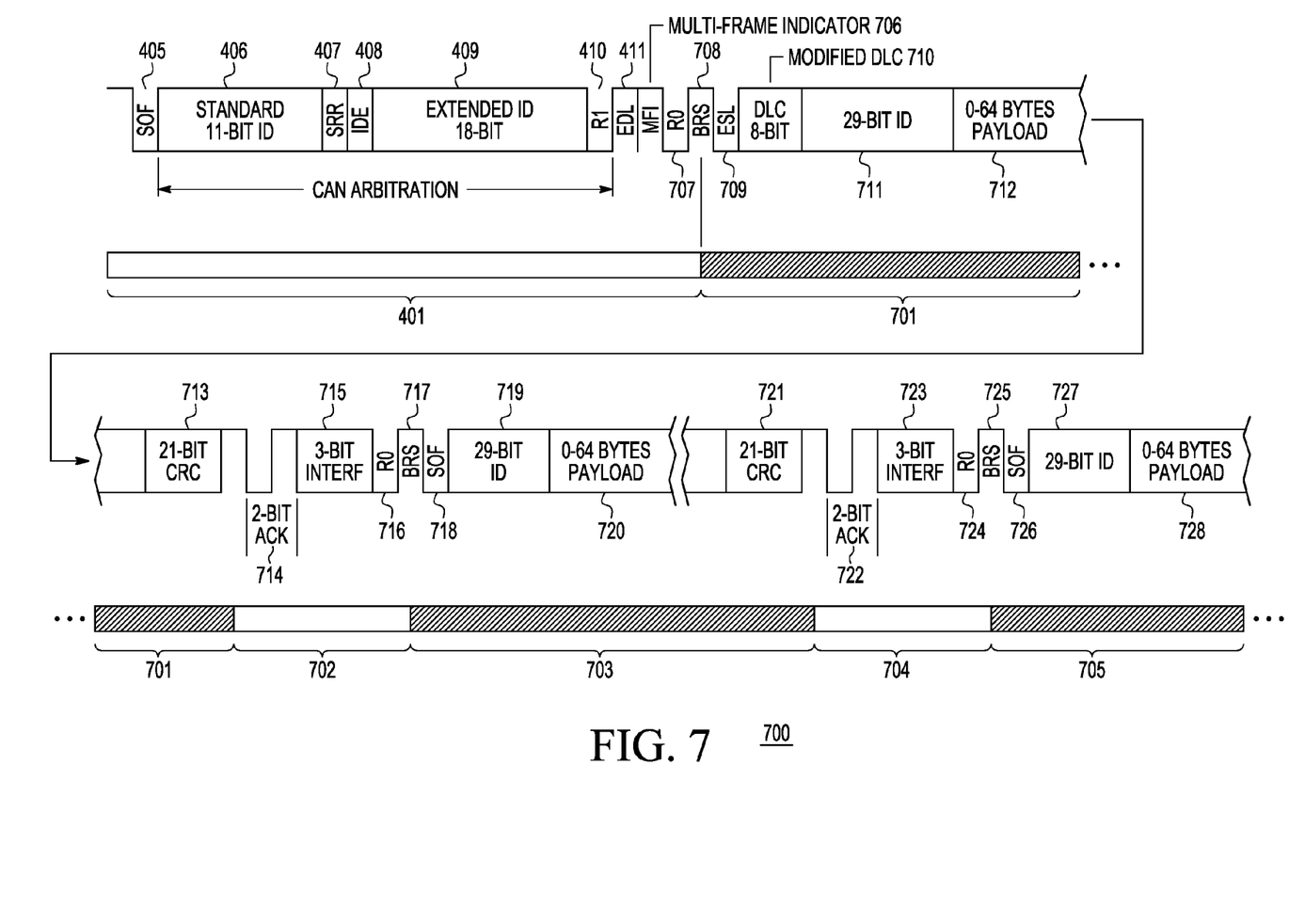
FIG. 7 is a diagram of a Multi-Frame CAN protocol frame(s) or message(s) according to some embodiments.

FIG. 7 is a diagram of Multi-Frame CAN protocol frame(s) or message(s) 700 according to some embodiments. Again, initial arbitration period 401 is the same as in FIG. 4, including portions 405-411. Portions 706-718, 720-726, and 728 are similar to their respective counterpart portions 606-617, 619-625, and 627 of Streaming frame 600. Similarly as in FIG. 6, high bit rate portions 701, 703, and 705, which include data payloads, are interspersed by low bit rate portions 702 and 704 without additional arbitration portions.

Similarly as before, MFI bit 706 may be used to indicate to a receiver node that Multi-Frame 700 is a Multi-Frame or a Streaming frame, and modified DLC 710 may include a value between "0001" to "1111" (binary) to indicate a multi-frame type of transmission and the number of frames to be transmitted. Modified DLC 710 may still indicate the data length of the payload for all Multi-Frame frames. Frame IDs 719 and 727 may precede each data payload portion 720 and 728 on the header of each frame.

In some embodiments, an abort feature may be implemented in Streaming frame 600 or Multi-Frame 700, for example, by including an abort symbol (e.g., 3 bits with a fixed value of "101") after a valid ACK symbol. For instance, the abort symbol may be issued by the transmitter or any other node. Any multi-frame or streaming of frames may be aborted. In some implementations, the abort may not be interpreted as an error. If issued by the transmitter, it means that it has completed the transmission of a streaming of frames or that it has aborted a transmission of multiple frames (multi-frame). If issued by a receiver node, the abort symbol may indicate that this particular node wants to abort the ongoing multi-frame or streaming of frames transmission in order to transmit a higher priority (lower ID) message.

In some cases, to implement the Multi-Frame and Frame Streaming techniques described above, message processing engine 301 of FIG. 3 may be modified to support the transmission and reception of a series of CAN frames without having an arbitration phase of the CAN bus between two consecutive frames, as shown in FIGS. 5-7. In some implementations, a Controller Host Interface (CHI) may be provided with CAN host 200 to store received CAN frames and transmit messages stored in local RAM that also understands the ID of the messages received in a streaming of messages or multi-frame messages.

As described herein, in an illustrative, non-limiting embodiment, a method may include, creating, by a device coupled to a CAN network configured to support a CAN FD protocol, a data frame comprising a field that indicates a multi-frame or streaming transmission, and transmitting the data frame in the multi-frame or streaming transmission. The method may also comprise indicating a length of a data payload portion of the data frame using the field. The method may further include indicating the multi-frame transmission and quantifying a number of additional data frames following the data frame as part of the multi-frame transmission without intervening arbitration using the field.

The method may also include transmitting, by the device, the additional data frames, each of the additional data frames including a frame identification field preceding a data payload. The method may further include indicating the streaming transmission using the field, where an identification of the data frame is usable by a receiver as identification of the additional data frames as part of the streaming transmission without intervening arbitration. The method also include initiating the streaming transmission, by the device, of the additional data frames, each of the additional data frames comprising a frame index portion indicating an index of a given data frame in the streaming transmission.

The method may also include incrementing a value of the frame index portion for each of the additional data frames and resetting the value if the number of additional data frames exceeds a predetermined number. The method may further comprise including an abort symbol in the data frame following an acknowledgement portion of the data frame. The abort symbol may be configured to indicate completion of the transmission of multiple data frames in the absence of error or to request interruption of an ongoing multi-frame or streaming of frames transmission to transmit a higher priority message.

In another illustrative, non-limiting embodiment, a CAN node may include message processing circuitry configured to receive a first data frame in a CAN FD network, the first data frame comprising a DLC field, the DLC field configured to indicate multi-frame operation, the message processing circuitry further configured to receive a second data frame following the first data frame in the absence of an arbitration process between the first and second data frames.

For example, the first data frame may include an MFI field preceding the DLC field, wherein the MFI field is configured to indicate that the first data frame is not a standard CAN FD frame. The DLC field may indicate a length of a data payload portion of the first data frame. Additionally or alternatively, the DLC field may indicate a number of additional frames to follow the first data frame. In some cases, the second data frame may include a frame identification field preceding a data payload field. Moreover, the first data frame may include an abort symbol following an acknowledgement portion, the abort symbol configured to indicate completion of the transmission of multiple data frames without error or to request interruption of an ongoing multi-frame transmission to transmit a higher priority message.

In yet another illustrative, non-limiting embodiment, a CAN node may include message processing circuitry configured to receive a data frame in a CAN FD network, the data frame comprising a DLC field, the DLC field configured to indicate streaming operation, the message processing circuitry further configured to receive a second data frame following the first data frame in the absence of an arbitration process between the first and second data frames. The DLC may include an identification of subsequent streaming frames. The message processing circuitry may be further configured to receive a stream of additional data frames, each of the additional data frames comprising a frame index portion indicating an index of a current frame in the stream.

The message processing circuitry may also be configured to determine that a value of the frame index portion for each of the plurality of additional data frames has been reset to indicate still additional data frames in the stream. The data frame may comprise an abort symbol following an acknowledgement portion, the abort symbol configured to indicate completion of the transmission of multiple data frames without error or to request interruption of an ongoing streaming of frames transmission to transmit a higher priority message.

It should be understood that the various operations described herein may be implemented by processing circuitry executing software, hardware, or a combination thereof. The order in which each operation of a given method is performed may be changed, and various elements of the systems illustrated herein may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The term "coupled" is defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method, comprising:
   in an automobile having a plurality of devices configured to communicate with each other over a Controller Area Network (CAN) supporting a CAN Flexible Data-Rate (FD) protocol;
   creating, by a device coupled to the CAN, a data frame comprising a field that indicates a multi-frame or streaming transmission;
   transmitting the data frame in the multi-frame or streaming transmission as part of a flashing operation;
   indicating a length of a data payload portion of the data frame using the field;
   indicating the streaming transmission using the field, wherein an identification of the data frame is usable by a receiver as identification of additional data frames as part of the streaming transmission without intervening arbitration; and
   initiating the streaming transmission, by the device, of the additional data frames, each of the additional data frames comprising a frame index portion indicating an index of a given data frame in the streaming transmission.

2. The method of claim 1, further comprising indicating the multi-frame transmission and quantifying the number of additional data frames following the data frame as part of the multi-frame transmission without intervening arbitration using the field.

3. The method of claim 2, further comprising transmitting, by the device, the additional data frames, each of the additional data frames including a frame identification field preceding a data payload.

4. The method of claim 1, further comprising incrementing a value of the frame index portion for each of the additional data frames and resetting the value if the number of additional data frames exceeds a predetermined number.

5. The method of claim 1, further comprising including an abort symbol in the data frame following an acknowledgement portion of the data frame.

6. The method of claim 5, wherein the abort symbol is configured to indicate completion of the transmission of multiple data frames in the absence of error or to request interruption of an ongoing multi-frame or streaming of frames transmission to transmit a higher priority message.

7. A Controller Area Network (CAN) node, the CAN node comprising:
   message processing circuitry; and
   a memory having program instructions stored thereon that, upon execution, configure the message processing circuitry to:
   receive a first data frame in a CAN Flexible Data-Rate (FD) network as part of a flashing operation, wherein the first data frame comprises a field configured to indicate: (a) a length of a data payload portion of the first data frame, and (b) a streaming operation, wherein an identification of the first data frame is usable by the message processing circuitry as identification of additional data frames as part of the streaming operation without intervening arbitration; and receive a second data frame following the first data frame in the absence of an arbitration process between the first and second data frames, the second data frame comprising a frame index portion indicating an index of the second data frame in the streaming transmission.

8. The CAN node of claim 7, wherein the field indicates a number of additional frames to follow the first data frame.

9. The CAN node of claim 8, wherein the second data frame includes a frame identification field preceding a data payload field.

10. The CAN node of claim 7, wherein the first data frame further comprises an abort symbol following an acknowledgement portion, the abort symbol configured to indicate completion of the transmission of multiple data frames without error or to request interruption of an ongoing transmission to transmit a higher priority message.

11. A memory device having program instructions stored thereon that, upon execution by message processing circuitry of a Controller Area Network (CAN) node, causes the CAN node to:

receive a data frame in a CAN Flexible Data-Rate (FD) network as part of a flashing operation, wherein the data frame comprises a Data Length Code (DLC) field configured to indicate: (a) a length of a data payload portion of the data frame, and (b) the streaming operation, wherein an identification of the data frame is usable by the message processing circuitry as identification of additional data frames as part of the streaming operation without intervening arbitration; and receive another data frame following the data frame in the absence of an arbitration process between the data frames, wherein the other data frame includes a frame index portion indicating an index of the other data frame in the streaming operation.

12. The memory device of claim 11, wherein the DLC field includes an identification of subsequent streaming frames.

13. The memory device of claim 11, the message processing circuitry further configured to receive a stream of additional data frames, each of the additional data frames comprising a frame index portion indicating an index of a current frame in the stream.

14. The memory device of claim 13, the message processing circuitry further configured to determine that a value of the frame index portion for each of the additional data frames has been reset to indicate still additional data frames in the stream.

15. The memory device of claim 11, wherein the data frame further comprises an abort symbol following an acknowledgement portion, the abort symbol configured to indicate completion of the transmission of multiple data frames without error or to request interruption of an ongoing streaming of frames transmission to transmit a higher priority message.

* * * * *